(12) United States Patent
Wang

(10) Patent No.: US 6,498,653 B1
(45) Date of Patent: Dec. 24, 2002

(54) TOOL PATH MEASUREMENT

(75) Inventor: Charles Wang, Compton, CA (US)

(73) Assignee: Optodyne, Inc.

( * ) Notice: Subject to any disclaimer, the term of this patent is extended or adjusted under 35 U.S.C. 154(b) by 0 days.

(21) Appl. No.: 09/744,203

(22) PCT Filed: Dec. 13, 1999

(86) PCT No.: PCT/US99/29451

§ 371 (c)(1),
(2), (4) Date: Jun. 5, 2001

(87) PCT Pub. No.: WO00/36367

PCT Pub. Date: Jun. 22, 2000

Related U.S. Application Data

(63) Continuation-in-part of application No. PCT/US99/14815, filed on Jun. 29, 1999.
(60) Provisional application No. 60/112,101, filed on Dec. 14, 1998.

(51) Int. Cl.[7] .............................................. G01B 15/02
(52) U.S. Cl. ...................................................... 356/498
(58) Field of Search ................................ 356/450, 496, 356/498, 614, 622, 623

(56) References Cited

U.S. PATENT DOCUMENTS

| | | | | |
|---|---|---|---|---|
| 4,621,926 A | * | 11/1986 | Merry et al. | 33/503 |
| 4,754,208 A | * | 6/1988 | Nakajima et al. | 318/570 |
| 5,106,192 A | * | 4/1992 | Tucker et al. | 356/477 |
| 5,537,016 A | * | 7/1996 | Barg et al. | 318/569 |

* cited by examiner

*Primary Examiner*—Michael P. Stafira
(74) *Attorney, Agent, or Firm*—Russell E. Hattis

(57) ABSTRACT

The degree of accuracy a machine tool or the like is moved along a given path is determined by a unique preferably laser beam directing measuring system directing simultaneously or in sequence a laser beam parallel to the orthogonal axes of the two or three dimensional space in which the spindle or other object is to be moved in a path which can diverge appreciably in directions other than the directions of these axes. The beam directing means includes means which provides a measure of the actual positions the object has at various sampling times relative to the axis along which the beam is directed. This actual path position data is compared to the desired path position data used to program the object moving machine to determine the path position error at the sampling times involved.

28 Claims, 7 Drawing Sheets

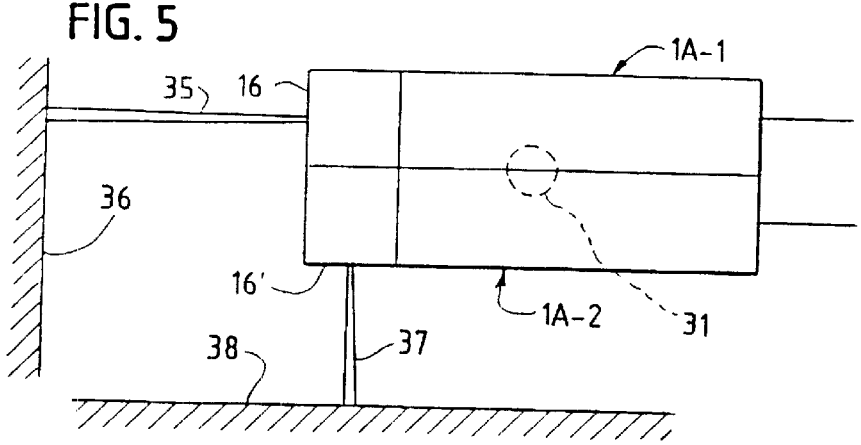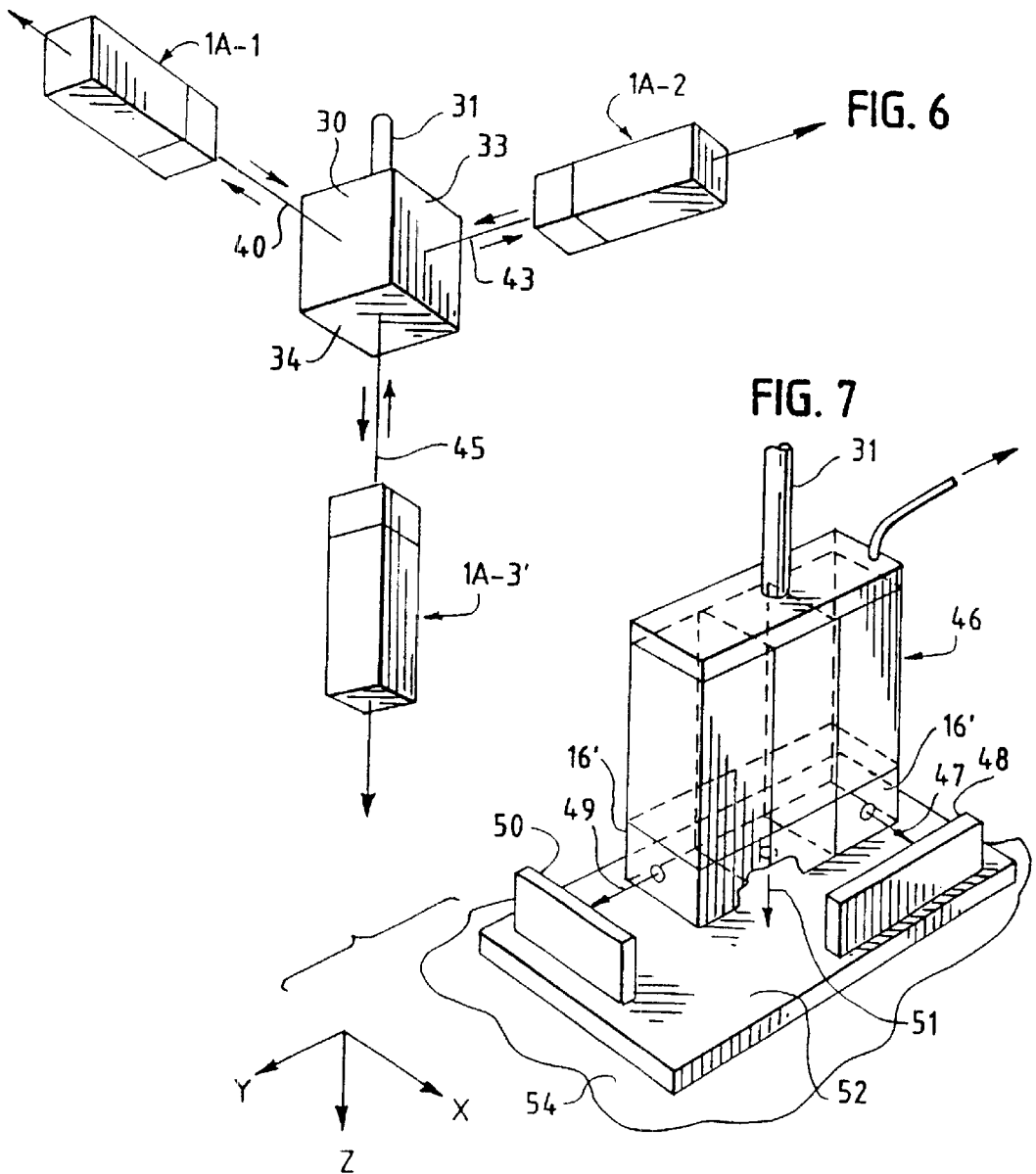

TOOL PATH MEASUREMENT

I. RELATED APPLICATIONS

This application is based on U.S. Provisional Application Ser. No. 60/112,101, filed Dec. 14, 1998. This application is a continuation-in-part of PCT Application Serial. No. PCT/US 99/14815 filed Jun. 29, 1999 and its corresponding Provisional applications in that the latter application(s) disclose(s) in FIGS. 10a, 10b and 10c thereof unique laser interferometer object displacement measuring systems useable also in the present invention and recited in some of the claims and disclosed respectively in FIGS. 1, 3A and 3 herein.

II. BACKGROUND OF INVENTION

For the machining of precision and quality parts, it is important to measure the machine accuracy and performance both at static conditions (low speed or stopped) and at dynamic conditions (high speed and multiple-axis). Laser interferometers have been used for the measurement of machine positioning accuracy at static conditions and relative to the position accuracy along each of the axes involved. That is, the measurements were not taken as the machine spindle was moving relative to the X, Y and Z axes involved for reasons including the fact that the laser systems which reflected a laser beam off of a retroreflector carried by the spindle could not intercept the reflected beam to make a measurement as the spindle was intentionally moved appreciably relative to these axes. The laser interferometer systems disclosed in said PCT application Ser. No. US 99/14815 do not have this severe problem.

A prior art device which can make such measurements but under relatively low speed circular spindle movement conditions uses a telescoping ball-bar (sometimes called double ball-bar or ball-bar).

The ball-bar consists of two steel balls supported by two three-point contact magnetic sockets, which are clamped to the spindle nose and on the table of the machine. The balls are connected by a telescoping bar, and movement is detected by a transducer similar to a linear variable differential transformer. The ball clamped on the table socket is the center of rotation, while the ball on the spindle socket performs circular motions.

The control system moves the spindle around a circle having the same radius as the ballbar's length. As the path deviates from a perfect circle, the change in distance between the two ends of the device is measured by the transducer. Hence, the deviations in circular interpolation or machine geometry are detected by the telescoping ballbar. The data collected is then plotted in a polar coordinate and compared with a perfect circle.

Telescoping ballbar systems normally work with radii of 50 to 600 mm.

The invention described herein uses laser measurement systems like that disclosed in said PCT application in a manner which can measure spindle displacement error under conditions where the spindle is stopped or preferably is moved at high speeds in circular or other path configurations. In contrast to the ball-bar technique, the present invention is able presently to measure spindle displacements accurately for circular path radii varied continuously from as small as 1 mm (1/50th of the minimum ball-bar size) to 150 mm and larger at feed rates up to 4 m/sec. at a data rate up to 1000 data points per second with a file size up to 10,000 data points per run.

A 2-dimensional grid encoder model KGM 101, manufactured by Heidenhain, Traunrent, Germany, can be used to determine the tool path and sharp cornering. (A 2-dimensional grid encoder is similar to a glass scale linear encoder, except that the grid pattern used is 2-dimensional instead of 1-dimensional so that it is able to measure the displacement in two directions, that is in a plane.) However, this 2-dimensional system is very expensive and difficult to use. Furthermore, the gap between the reader head and the grid plate used therein is very small, so careful alignment is necessary to avoid a crash and damage to the glass scale.

There are many inferior prior art laser interferometer techniques for tool path measurement. For example, K. C. Lau and R. J. Hocken has developed three and five axis laser tracking systems (see U.S. Pat. No. 4,714,339, granted Dec. 22, 1987.) This patent discloses a laser interferometer using a retroreflector as target, another laser beam reflecting device and a quad-detector tracking device to point the laser beam always at the retroreflector. The position of the retroreflector is determined by the laser interferometer (radial distance) and the laser beam direction (two angles) as in a polar coordinate system. W. F. Marantette uses a machine tool position measurement employing multiple laser distance measurements; U.S. Pat. No. 5,387,969, granted Feb. 7, 1995 discloses three laser interferometers and a scanning mirror device to point the laser beam to the retroreflector. The spindle position in a plane is determined by the measurements of the two laser interferometers using the formula of triangulation. However, these systems are very complex and less accurate than the present invention.

Another inferior technique in one used by J. C. Ziegert and C. D. Mize (measurement instrument with interferometer and method) as disclosed in U.S. Pat. No. 5,428,446 granted Jun. 27, 1995. It discloses the use of a laser interferometer to replace the linear transducer in a telescoping ball-bar gauge.

Since a laser interferometer is more accurate and longer range than a linear transducer, the measurement range becomes larger. Hence, it is possible to measure non-circular tool paths, and the spindle position can be determined by trilateration. However, it cannot be used to measure small circles and it is also very expensive.

Thus, the ball-bar and other prior techniques for making dynamic tool path measurements are either inaccurate, incomplete, time consuming, or extremely costly relative to that achievable with the present invention.

III SUMMARY OF INVENTION

Briefly, conventional laser interferometers using a retroreflector as the target mounted on the machine tool spindle can measure the linear displacement relative to a single axis thereof accurately. However, the tolerance for lateral displacement is rather small. Using preferably a single-aperture (or less desirable modified prior art two-aperture) laser target displacement measuring system like the Laser Doppler Displacement Meter (LDDM) of Optodyne, Inc. of Compton Calif. and a large flat-mirror or unusually large retroreflector as the target, the linear displacement along the laser beam direction can be measured with large tolerance on lateral displacement under small angular shifting of the target. This angular shifting problem can be minimized using a unique diverging laser beam when a flat-mirror target is used as shown in FIG. 3.

Using three such laser systems, pointing their laser head beams at 90 degree to each other, namely in the X, Y and Z axis directions, with preferably three flat-mirror targets perpendicular to the three axes respectively, the xyz-coordinate displacements of the target trajectory can be measured simultaneously. While it is preferred to place the flat mirrors on the spindle with the laser heads mounted on a stationary surface, the present invention also envisions reversing the positions of the laser heads and flat mirrors.

However, a preferred specific aspect of the present invention which reduces the equipment cost considerably to the customer is to use only one such system where the preferably stationary laser head thereof is sequentially directed along each of these axes to make three sequentially taken target displacement measurement sequences. This less costly system is only useable when the target positions can be repeated in sequence exactly, which is usually the case. In such case, three flat mirrors are preferably placed on the spindle facing in the directions of the three axes, or one flat mirror designed to be mounted sequentially on three different axially facing sides of the spindle are so placed, before each measurement sequence is taken. (As above indicated, the laser head and mirror locations can less desirably be reversed so that the laser head is mounted on the spindle target sequentially on different sides thereof and one or three mirrors are mounted on a stationary surface facing in the three directions to intercept the laser head beams.) In this form of the invention, a means is provided to synchronize the three sets of sequentially taken data so that the measurements for the corresponding positions and data sampling times of the target are related. This can be done in a number of ways, one by starting the data sampling times as the target is at the same path position when target position sampling begins. Another way is to program the tool path to do a "spike" motion, for example, a rapid back and forth motion along a 45 degree direction between the axes involved.

The invention provides data collection, storage, computing, synchronizing and outputting processing means which supplies and stores information on the deviation of the actual from the programmed target (e.g. the machine tool spindle) positions for each sampled X, Y or Z axis position of the target and preferably also from the actual desired path thereof. Thus, these means have stored therein digital data representing the desired positions of the target along the various axes for the various target position sampling times involved and this desired target position data is compared with the corresponding actual measured axis target position data involved. The resulting axis position error numbers for each sampled target path position along each axis are stored for printout as path deviation numbers for each desired path position involved.

In accordance with another aspect of the invention, the data outputting means outputs the data to a printer or plotting means which displays two sets of overlaid lines, one representing the desired target path and the other the actual path in a manner where the degree of deviation is readily visible. Usually the deviations between the actual and desired target paths are so small that these differences are not visible on the overlaid lines. This problem is overcome by multiplying the axis deviation numbers by as much as a thousand or more times, adding the multiplied numbers to the desired target position numbers along the axes at the sampling times involved and then displaying on a printer or plotting device the modified actual and programmed position-indicating lines together.

If the target trajectory is to be only a circle in one plane, it is especially desirable to store the path deviation numbers for each sampling time for number printout in polar (i.e. angular) as well as axial terms. Thus, the polar deviation error for a particular target position along the circular path involved is computed from the X and Y axis position error numbers involved by computing the square root of the sums of the squares of these numbers. Also, when the target path is to be a circle in one plane, the sequentially taken data can be synchronized easily even when the X and Y axis related data taken at the same sampling rate starts with the target at different path position points. Thus a circular path is generated and displayed by simultaneously combining the data taken along the two axes, with the maximum or minimum displacement data taken along one axis corresponding in time to the mean (half-way between minimum and maximum) values of the other. The waveforms of such data is a sine-like curve representing the position data for one axis and a cosine-like curve representing the position data for the other axis when the sampling times are equally spaced periods.

The tool path R for any path configuration can be expressed as:

$$Ri(Xi,Yi,Zi), i=1,2,\ldots N \qquad (1)$$

Where $Xi$, $Yi$ and $Zi$ are data collected with laser system #1, #2 and #3, respectively and simultaneously where three systems are used or when one system is used sequentially as described. Once the phase relation of these three sets of data is determined as just described, the tool path $Ri$ are determined by substituting these three sets of data into Eqn. 1. This composite tool path may be deviated from the tool path measured by 3 laser systems simultaneously if the tool path is not repeatable and the velocity of the motion is not constant. The effect of non-repeatable and non-uniform velocity of the motion can be minimized by collecting data over several cycles and using the mean values.

Similarly, for a complete 6 degree spindle motion, x, y, z, pitch, yaw, and roll, 6 laser systems can be used to measure the tool path $Ri(Xi, Yi, Zi, X'i, Y'i, Z'i)$. The pitch angle is $(Xi-X'i)/d$, where d is the beam separation. The yaw and roll angles are $(Yi-Yi')/d$ and $(Zi-Z'i)/d$ respectively.

IV. DESCRIPTION OF THE DRAWINGS

FIG. 1 is a schematic showing a double-path parallel beam optical arrangement of a laser system useable in the present invention and utilizing an unusually large retroreflector facing a laser head to reflect its beam against a stationary flat mirror even when the retroreflector or the laser head is moved appreciably away from the measuring axis involved.

FIG. 2 is a schematic showing a double-path un-parallel beam optical arrangement of a laser measuring system where a flat mirror most advantageously mounted on a machine tool spindle opposite and at an angle to a laser beam directed from the laser head reflects the beam toward a stationary retroreflector much smaller than that shown in FIG. 1 and facing the flat mirror reflected beam. As compared to the FIG. 1 arrangement, the FIG. 2 system, while simpler to setup than the FIG. 1 system, is undesirably more sensitive to unwanted spindle tilt and the useable measurement range is much shorter than that for the FIG. 1 system.

FIG. 3 is a schematic showing a single-path laser system useable in the present invention, the system using a preferably stationary laser head with a beam-spreading lens system directing the diverging beam to a flat mirror preferably mounted on the machine tool spindle. As compared to the FIG. 1 arrangement, it is somewhat more undesirably sensitive to the unwanted tilt of the machine tool spindle and the range of the measurement is shorter by about 10 to 20 inches. However, for most machine tools with working volumes of 40"×20"×20", this is the preferred laser system of the invention.

FIG. 5 is a schematic showing two single-aperture laser heads mounted on a spindle with one laser head pointing its beam in the X-direction and another laser head pointing its beam in the Y-direction and two flat mirrors mounted on the machine bed respectively perpendicular to the two laser beams, the motion of the spindle being measured by the two laser systems simultaneously.

FIG. 6 is a schematic showing a 3-dimensional laser measuring system like the two-dimensional system of FIG. 4, but with a third laser head and a third flat mirror added on the machine pointing in the z-direction.

FIG. 7 is a schematic showing a 3-dimensional FIG. 1 type measuring system similar to FIG. 5, but with a third laser head mounted on the spindle and a flat mirror added on the machine bed pointing in the Z-direction, the motion of the spindle being measured by the three laser system simultaneously.

Figure 8:
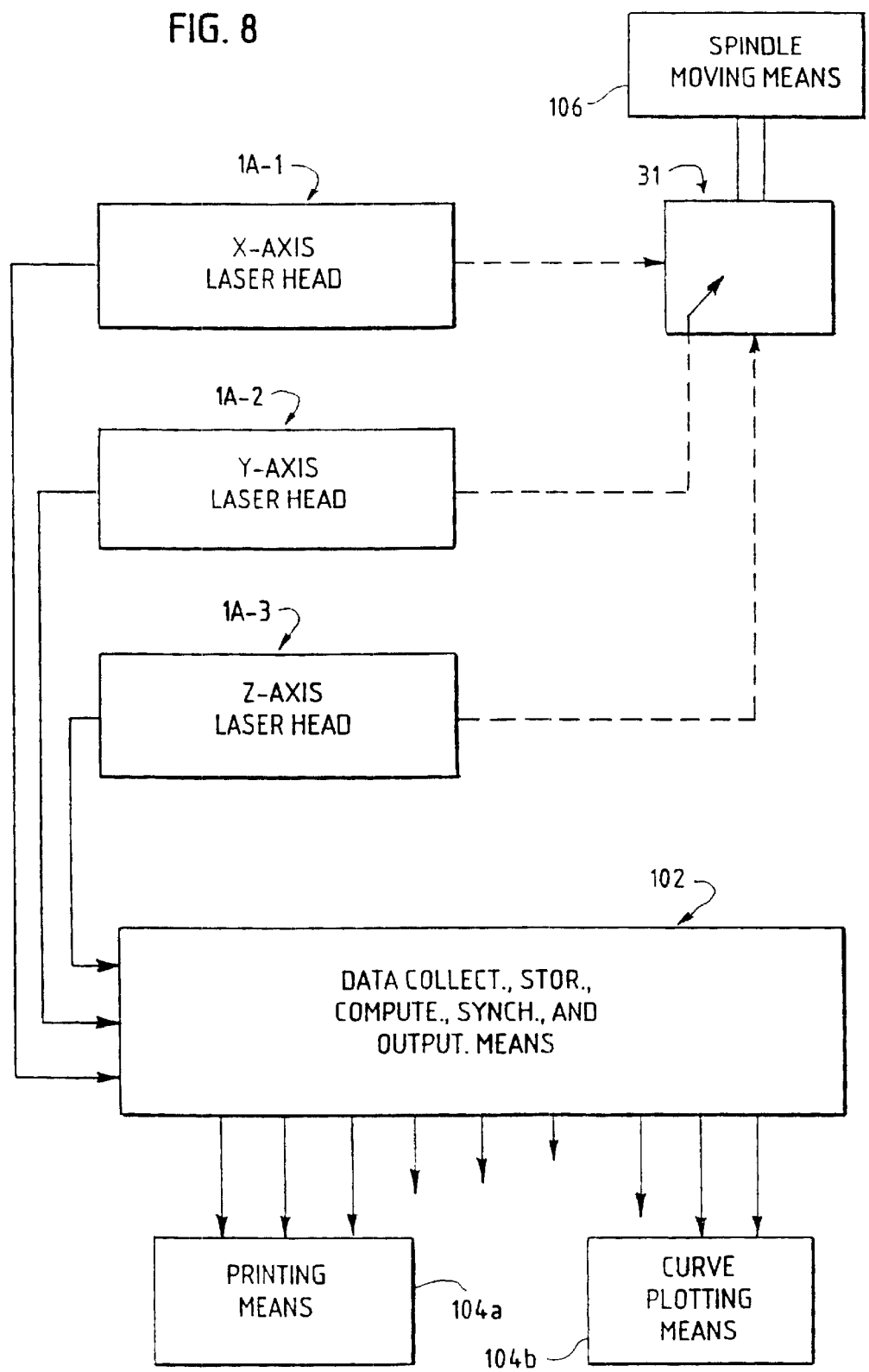

FIG. 8 is a block diagram showing three of the laser heads involved pointing their beams respectively in the X-direction, Y-direction and Z-direction. (If one system is used sequentially as previously described, then the three laser heads shown represent the one system sequentially positioned to direct its beam parallel to these directions.) FIG. 8 also shows a block representing portions of a PC or other data collection and processing system involved which collects, stores, computes, synchronizes, and outputs the computed position error data to a printer or curve plotter there shown.

Figure 9A:
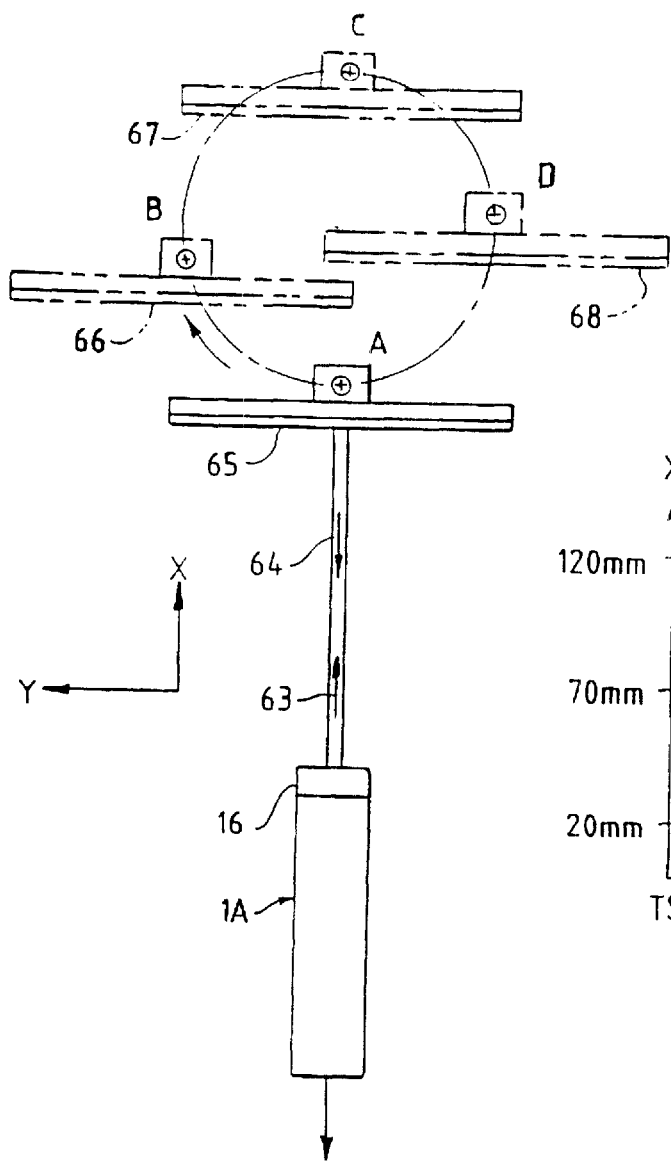
Figure 9B:
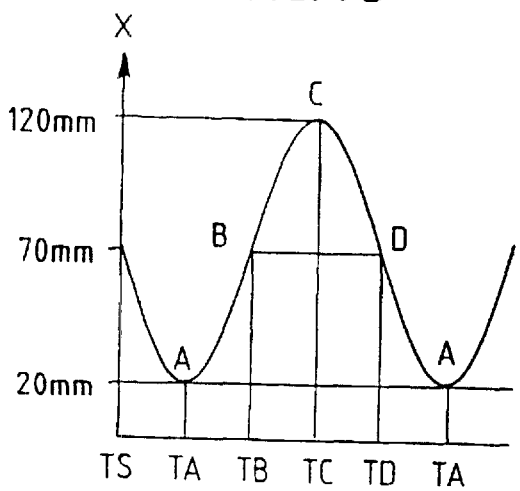
Figure 9C:
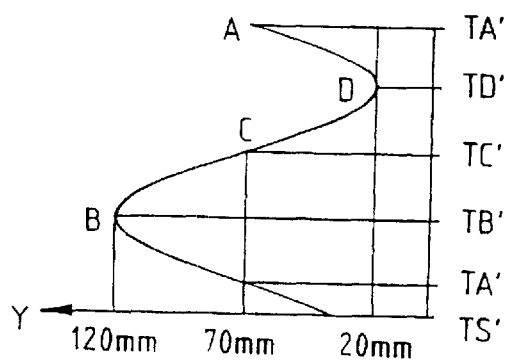

FIG. 9A is a schematic showing in solid lines a flat mirror mounted on a machine tool spindle in a (0 degree) position A, the spindle to be ideally moved clockwise 360 degrees in a circular clockwise path having 90, 180, and 270 degree positions represented respectively by reference characters B, C and D. (The 360 degree position is also shown by reference character A.) FIGS. 9B and 9C drawn respectively below and to one side of the laser system of FIG. 9A represent respectively the desired X and Y axis spindle displacement verses time curves oriented at 90 degrees to one another for the various assumed equally spaced sampling times involved, and show the X and Y axis data starting at respectively different random starting times T(S) and T(S)', the times T(A,), T(B,D), and T(C) and T(D)', T(C.A)' and T(B)' being respectively the random times when the spindle is programmed to be at the minimum, medium and maximum X and Y axis displacement points.

Figure 10A:
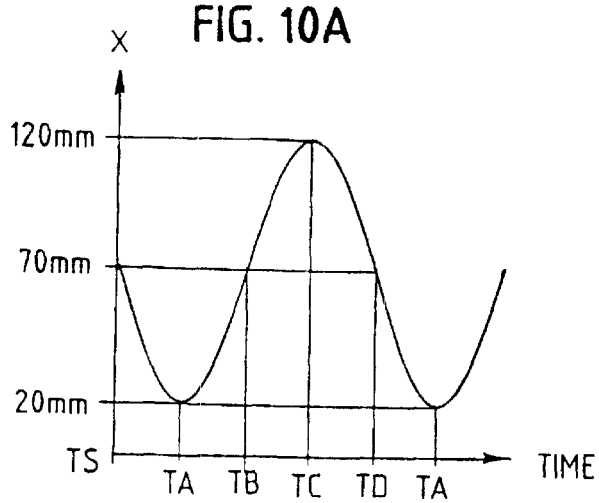
Figure 10B:
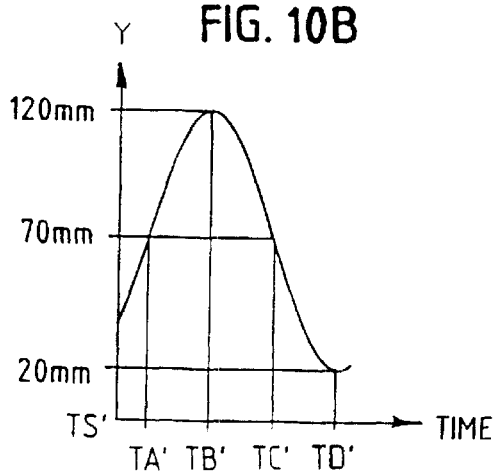
Figure 10C:
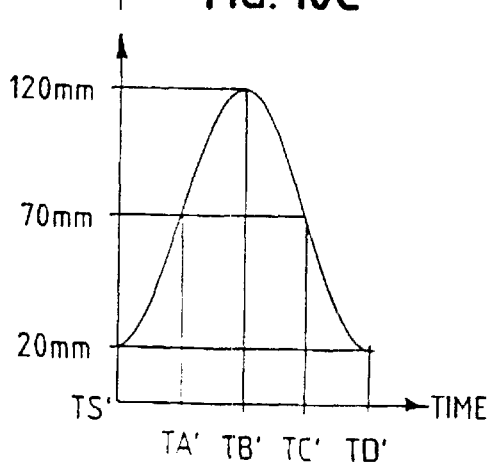

FIGS. 10A and 10B are the X and Y axis displacement verses sampling time curves of FIGS. 9B and 9C drawn to a horizontally oriented time base when the time axes start at times T(S) and T(S)'. FIG. 10C shows the Y axis displacement curve shifted (i.e. synchronized) so that the minimum, median and maximum x axis displacement points of the X axis data curve are opposite the median, maximum and minimum points of the medium displacement points of the Y axis data curve as they would be if such data were taken at the same rather than at different sequential random starting times.

Figure 11:
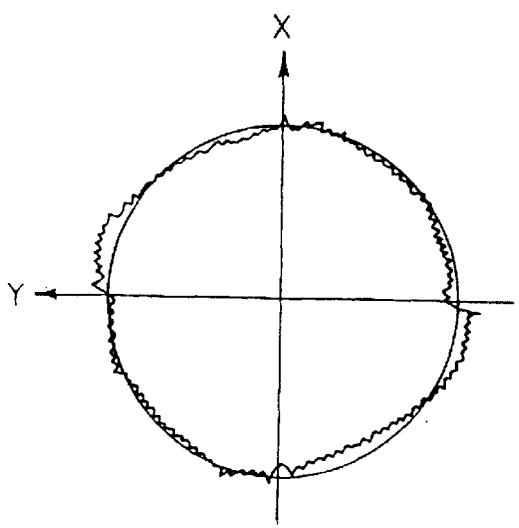

FIG. 11 shows an ideal circular curve representing the desired programmed spindle displacement overlapped by an imperfect circular plot showing the various deviations of the actual measured spindle positions for the corresponding polar positions of the spindle, but with the deviation amounts multiplied by a factor of about 1000 so that the deviations from the actual and desired circular path can be seen.

Figure 12A:
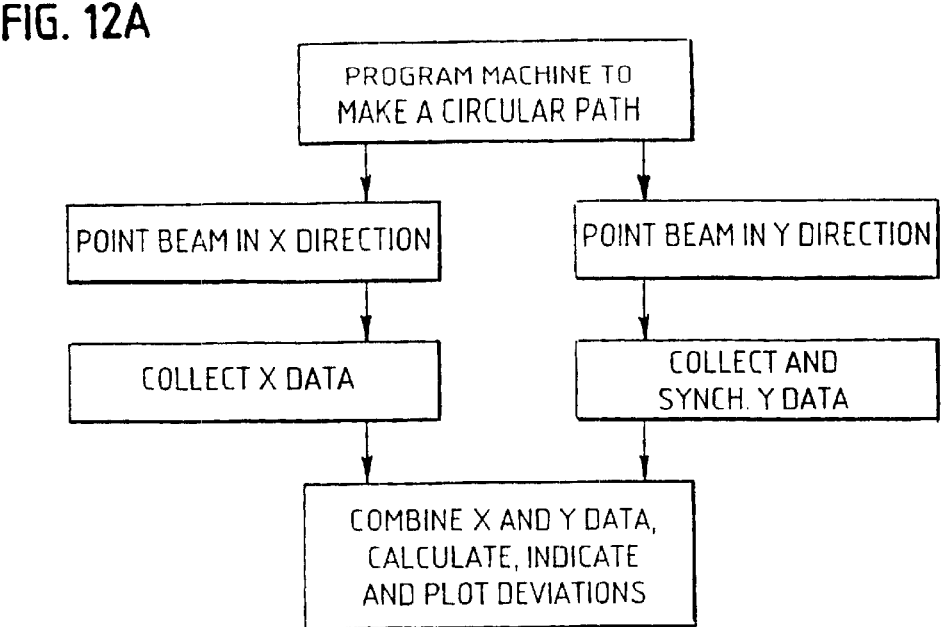

FIG. 12A is a block diagram showing the broad program routine sequences used to do a circular test in the XY-plane as shown in FIG. 11, using a single laser system sequentially to measure the spindle movements along the X and Y axes.

Figure 12B:
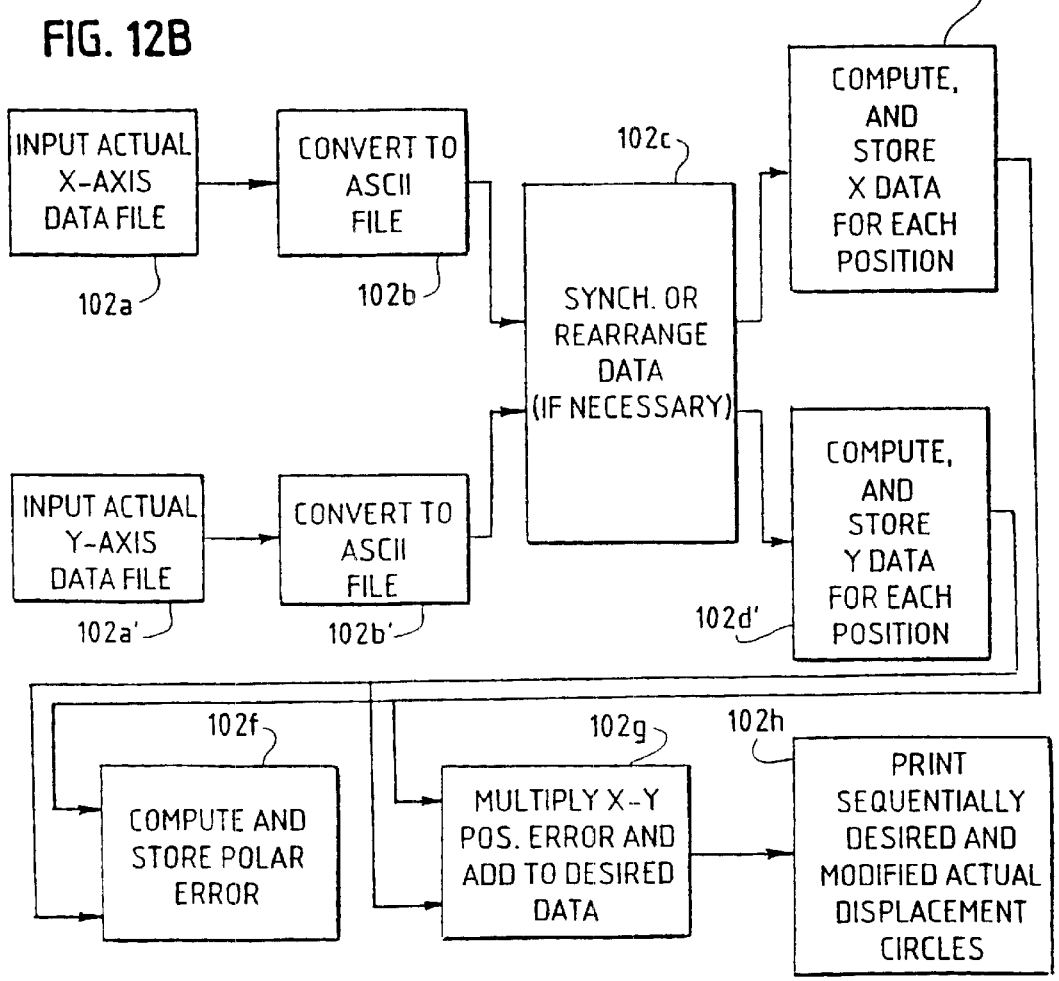

FIG. 12B show a much more detailed block diagram showing the more detailed program steps performed by the program involved than that shown in FIG. 12A.

Figure 13:
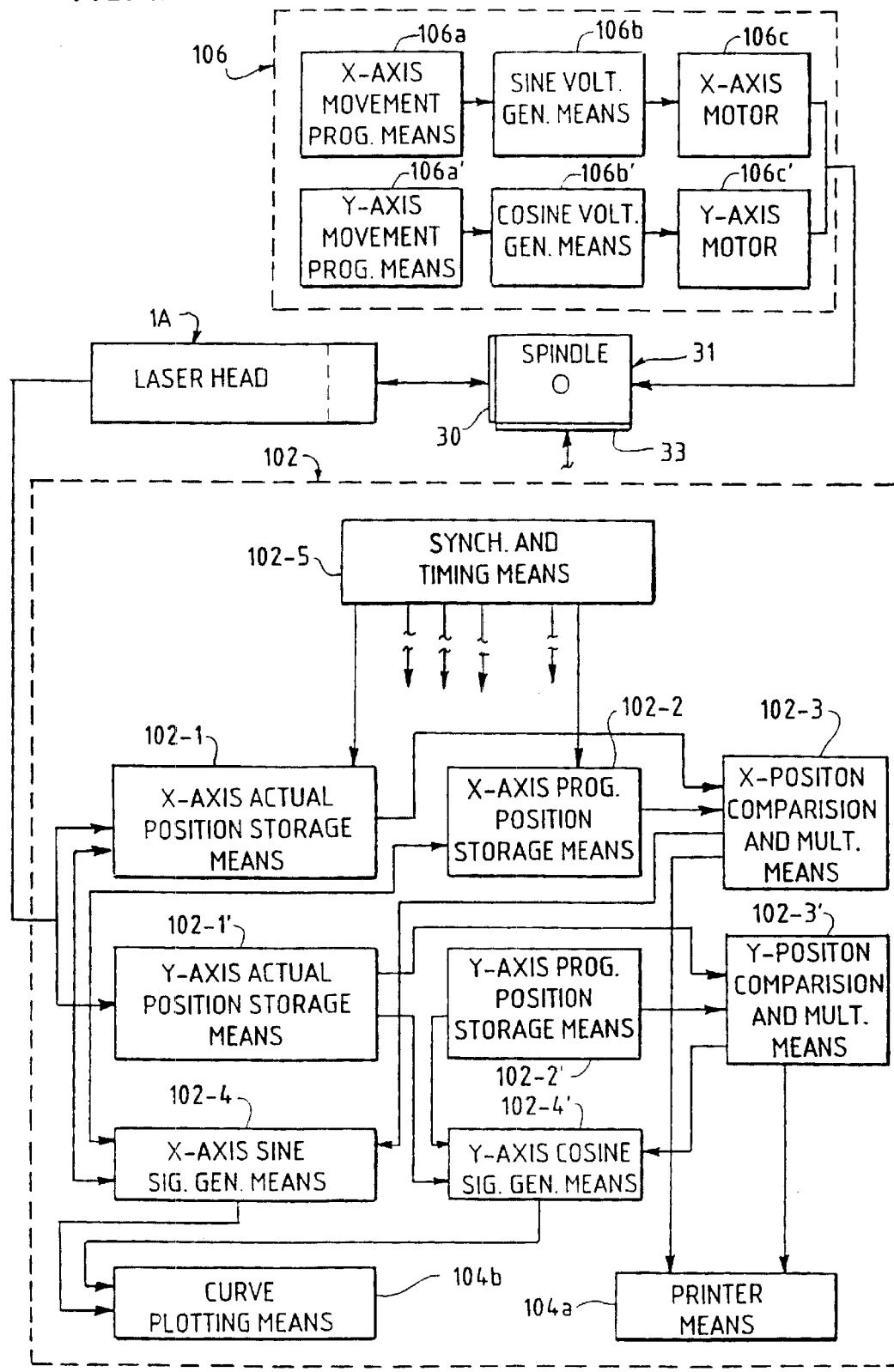

FIG. 13 is a block diagram like FIG. 8, but showing in block form using additional blocks to illustrate the functions carried out by the blocks 102 and 106 in FIG. 8, when the present invention is practiced using only one laser head sequentially positioned to direct its beam along the X and Y axes to determine and display a circular target path error.

V. DETAILED DESCRIPTION OF THE ILLUSTRATED EMBODIMENT

Figure 1:
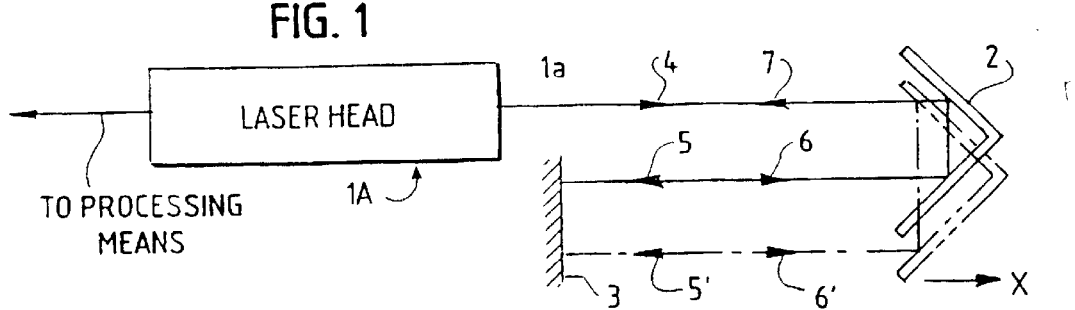

The double-path parallel beam laser system shown in FIG. 1 consists of a single-aperture laser head 1A, an unconventionally large retroreflector 2 and a flat-mirror 3. (For example, the retroreflector could be as large as 10" inches in diameter.) The laser head's output laser beam 4 is first reflected by the large retroreflector 2 to produce a first reflected beam 5 parallel to but displaced from output beam 4. The flat mirror 3 is perpendicular to the first reflected beam 5, hence the flat mirror-reflected beam 6 coincides with the first reflected beam 5, but in the opposite direction. The latter beam 6 is reflected again by the large retroreflector 2 to form return beam 7 which coincides with output beam 4 but in the opposite direction and is returned to the single laser head aperture. It is noted that the property of the retroreflector 2 is that the incident beam direction and the reflected beam direction are parallel and in the opposite direction. This property is not affected by the location and angle of the incident laser beam. Also, if the retroreflector 2 is moved perpendicular to the output beam 4, the first reflected beam 5 will move to a different position on the flat mirror 3. However, the position of the return beam 7 will not change and the total path length from laser head to the flat mirror due only to this perpendicular movement remains the same. Therefore, the displacement measured is in the beam direction parallel to the X-axis shown. The X-axis measurement also will not be effected by any retroreflector movements perpendicular to the other (Y and Z) axes.

The laser head 1A and similarly identified laser heads shown in FIG. 1 and the other drawings are preferably, but not necessarily, single-aperture, single beam laser heads made and patented by Optodyne, Inc. of Compton Calif. U.S. Pat. No. 5,116,126 discloses one such Optodyne laser head which, as do others, provide an accurate measure of the distance between a preferably laser beam source and a reflector opposite the beam source. One of the beam source and reflector is mounted on a target, such as a machine tool spindle, and the other on a stationary surface, like a machine tool bed. Other reflectors, in addition to the one opposite the beam source, such as those to be herein described. (Also, other but less desirable beam energy target displacement measuring systems may be used in accordance with the broadest aspects of the invention.)

Figure 2:
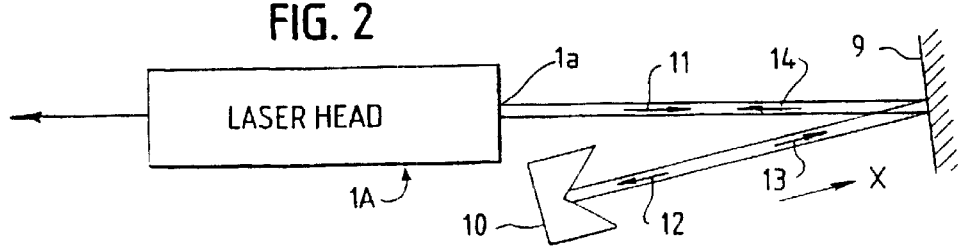
Figure 3:
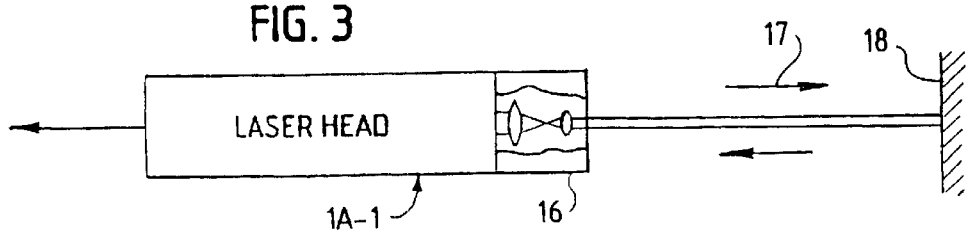
FIG. 3A shows a commercially available double-aperture laser head 1B with a modified optical arrangement using a flat mirror 9 as the target.

FIG. 2 illustrates a double-path angular reflected laser beam system producing unparallel output and first reflected beams which can be used in the present invention. FIG. 3 of Optodyne U.S. Pat. No. 5,394,233 shows such a laser beam system. This system comprises a single-aperture laser head 1A, a large flat mirror 9 directed at an angle to the output beam 11 and a preferable normal sized retroreflector 10 (to minimize system cost) much smaller than the reflector 2 in FIG. 2 and facing the beam 12 first reflected from the retroreflector 10. The output laser beam 11 is reflected by the flat mirror 9 towards the retroreflector 10. The first reflected beam 12 is reflected back by the retroreflector 10 towards the flat mirror 9 which produces a reflected return beam 14 received by the aperture of the laser head 1A.

Since the output and return beams 11 and 14 are not parallel to the reflected beams 12 and 13, when the flat mirror 9 moves forward or backward relative to the laser head 1A the return beam 14 is still parallel but shifted from output beam 11. The amount of the shift is inversely proportional to the angle between beams 11 and 12. Hence the measurement range is longer for smaller angles or larger initial flat-mirror to laser head spacing. For example, the retroreflector 10 is placed very close to the laser head 1A. For a 5 mm diameter laser beam, the range is about +/− 20% of the distance between the laser head 1B and the flat mirror 9. Also because of the double-path and the (cosine) beam angle involved, the laser reading is increased by the factor 2*Cos(theta), where 2 is for the double-path and theta is the angle between beams 11 and 12. Also, when the flat mirror 9 is moving in the Y-direction perpendicular to the illustrated X-axis measurement direction, the measurement reading of X will show Y*Sin(theta). Hence it is important to keep the angle theta small.

As in the FIG. 2 and other embodiments of the invention using two reflecting mirrors, the mirror used to reflect a beam directed to it from the reflector first receiving the laser head beam and the laser head involved can both be mounted together on a stationary surface or on the target (e.g. machine tool spindle) and the mirror which first receives the laser head beam can be mounted on the other of same.

FIG. 3, illustrates a single aperture, single path laser measurement system with a large flat mirror 18 facing the laser head 1A as the target. A lens system 16 placed adjacent to the laser head aperture converts the collimated beam of the laser head to a divergent output beam 17. The output laser beam 17 is reflected by the flat mirror 18 and returned to the laser head 1A through the lens system 16. Because the beam is divergent, the laser beam should return to the receiving aperture even when the flat-mirror 18 is undesirably tilted a small angle (less than one half of the beam divergence angle). Since the target is a large flat mirror 18, any displacement perpendicular to the incident laser beam 17 or parallel to the mirror surface will not change the path length from the laser head 1A to the flat mirror 18. Therefore, the displacement measured is in the beam direction only so that the measurement will not be affected by any displacement perpendicular to the beam direction. However, this assumes that the flat mirror is perpendicular to the laser beam 17. Any small tilt angle theta will cause a lateral coupling of Y*Sin(theta) or Z*Sin(theta).

FIG. 3A shows a commercially available double-aperture laser head 1A with a modified optical arrangement using a flat mirror 9 as the target. The output laser beam 20a is reflected by the flat mirror target 9 as a return beam 20b back toward the exit aperture of the laser head 1B. A beam splitter means 18 then reflects downward as viewed in FIG. 3A half of the return beam 20b toward an angular directed fixed high reflectivity mirror 20c which reflects the beam to produce a return beam 209 to the second receiving aperture of the laser head 1A.

Figure 4:
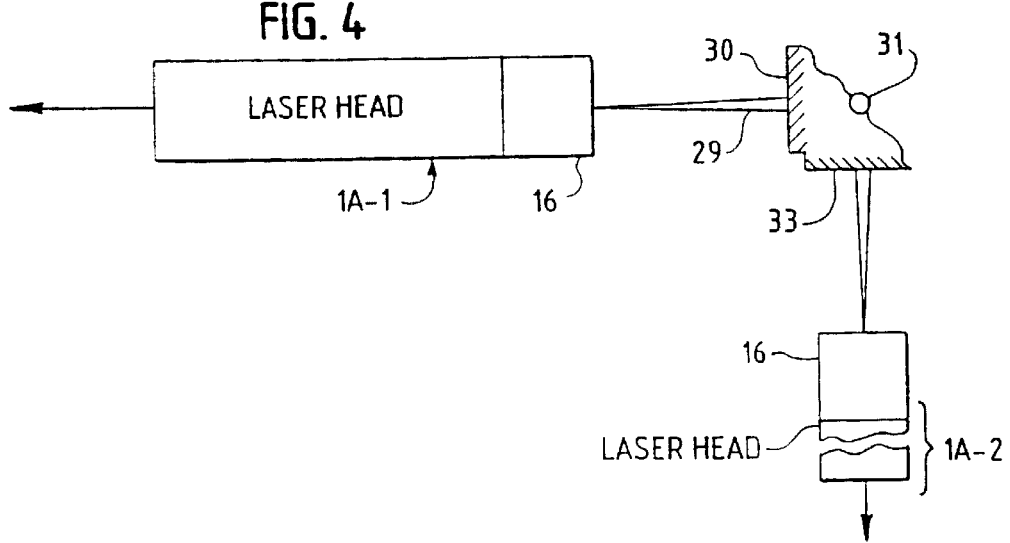
FIG. 4 is a schematic showing two single-aperture laser heads mounted on a stationary surface pointing their beams in the X-direction and Y-direction respectively, and two large flat mirrors mounted on a machine tool spindle, the motion of the spindle being measured by the two laser systems simultaneously.

FIG. 4 illustrates a two-dimensional laser measurement system using two laser heads 1A-1 and 1A-2 and accompanying beam-diverging lens systems 16 as shown in FIG. 3 mounted on a stationary surface. Here two flat mirrors 30 and 33 mounted on a machine tool spindle 31 are positioned to face in two different orthogonal directions along which are directed the oncoming diverging beams emanating from the lens systems 16. Hence the 2-dimensional displacement of the spindle 31 can be measured by the laser heads 1A-1 and 1A-2 simultaneously. The range of the spindle displacement is limited by the size of the flat mirrors 30 and 33.

FIG. 5 illustrates a similar two-dimensional laser measurement system where the similarly oriented mirrors 36 and 38 are shown mounted on stationary surfaces, such as on the machine tool bed, and the laser heads 1A-1 and 1A-2 are mounted together and parallel to each other. Their associated beam diverging lens systems 16 and 16' are mounted on the machine tool spindle 31. The lens system 16 is the same as that shown in FIG. 3 and directs a divergent beam 35 horizontally as viewed in FIG. 5, whereas the lens system 16' directs a divergent beam 37 beam in a downward direction as viewed in FIG. 5. The range of the spindle displacement is only limited by the size of the flat mirrors 36 and 38. For 12" size flat mirrors, the spindle is limited to move within a 12 inch range relative to each axis. Similarly, if one more laser system is added to that shown in FIG. 4 or FIG. 5, 3 dimensional spindle tool path displacement can be measured along the three axes simultaneously, as shown also in FIGS. 6, and 7.

FIG. 6 illustrates a 3-dimensional laser measurement system using three laser heads 1A-1, 1A-2 and 1A-3, like that shown in FIG. 3 (although they could be other beam sources as, for example, like those shown in FIGS. 1 or 2). The laser heads are shown and mounted on the machine tool bed directing their beams 40, 43 and 45 simultaneously respectively along the X, Y and Z axes of the tool path movement space toward three flat mirrors 30, 34 and 33. These mirrors are mounted on the machine tool spindle 31 so as to face the respective oncoming laser heads beams 40, 43 and 45. The outputs of the laser heads shown in this Figure and in FIG. 4, if they are produced by said Optodyne laser heads are binary signals which indicate the various X, Y and Z axis positions of the target involved. Timing signals generated by the processing means to which the laser head outputs are fed store the target positions at the sampling times involved.

FIG. 7 illustrates a 3-dimensional laser measurement system similar to the two-axis system of FIG. 5, but with one additional laser head mounted on the spindle 31. The three laser heads appear as a single housing assembly 46. The assembly 46 has laser beam-diverging lens systems 16 and 16' at the bottom thereof directing diverging beams 51 and 49 along the horizontally directed X and Y axes toward flat mirrors 48 and 50 mounted on the machine tool bed 54. The third laser head forming part of the assembly 46 directs a diverging beam downward in the Z axis direction onto a mirror 52 mounted on the top surface of the bed 54.

The FIG. 6 and FIG. 7 embodiments could be modified so that any of the various combinations of positions of the laser heads and flat mirrors could be used. Thus the spindle could carry one or two instead of three flat mirrors or one or two instead of three laser heads.

FIG. 8 is a block diagram showing three of the laser heads 1A-1, 1A-2 and 1A-3 involved pointing their beams respectively in the X-direction, Y-direction and Z-direction upon mirrors carried on the spindle represented by box 31. (If one system is used sequentially as previously described, then the three laser heads shown represent the one system sequentially positioned to direct its beam parallel to these directions.) FIG. 8 also shows blocks 104a and 104b representing respectively a printer and line plotter and a box 102 representing the processing portion of a PC or other data collection and processing system involved which collects, stores, computes, synchronizes, and outputs the computed position error data to the printer 104a and/or curve plotter 104b.

More specifically, some of the functions performed by the data processing means represented by the box 102 are: (a) the conversion, storing and arranging, when necessary, of the X, Y and Z axis displacement-indicating information fed from the laser heads to binary and digital form for the various equally time-spaced sampling times when measuring data is taken so that the X, Y and Z axis data for the various sampling times is identified; (b) the computing and storing for future printout of the path error differences between the desired and actual position of the spindle relative to each of the axes involved at the various corresponding sampling times; (c) the multiplying and storing of these multiplied difference values if a visual overlapping line plot of the desired and actual spindle path positions as shown in FIG. 11 for a circular path; (d) the addition of the multiplied position error values to the stored data representing the ideal path positions for the sampling times involved; (e) the conversion of the various multiplied axis error values to polar values when a circular path is involved; and (f) the feeding of signals to the printer 104a or plotter 104b to read out the path error data in axial or polar error-indicating form. Where a circular line plot is desired the processing means 102 would generate sinusoidal and co-sinusoidal-like voltages representing the desired and actual spindle movements for feeding to a line plotter requiring such voltages.

FIG. 8 also shows a box 106 identified as spindle moving means whose component parts are shown in more detail in FIG. 13 which also shows individual blocks showing storage and program elements which respond to the stored position data to generate the various signals fed to the printer and plotter where the target is moved only in a circular path.

FIG. 9A illustrates a circular path error test using only one laser head 1A to sequentially positioned to direct its beam along the X and Y axes where target position measurements are taken without concern for the position of the target when a measurement sequence begins and is taken at predetermined sampling rate. In the system there illustrated, the laser head 1A mounted on a stationary surface has a beam-diverging lens system 16 directing a beam 63 to a flat mirror 65 mounted on a machine tool spindle to be moved in a clockwise circular path. The X-axis directed output diverging laser beam 63 is shown reflected by the flat mirror 65 and returned to the laser head 1A as a return beam 64. Because the beam is divergent, the laser beam should return to the laser head receiving aperture even when the flat mirror 65 is undesirably tilted by a small angle. The reference characters A, B C and D in FIG. 9A show the flat mirror-carrying spindle positions at the 0, 90, 180 and 270 degree positions of the desired circular path involved. The output beam 63 is always reflected back as beam 64 by the flat mirror 65 at the A, B, C and D and the positions therebetween. After measurements are taken at the selected sampling times with the beam directed along the X axis, To complete the circular path test, the laser head 1A is moved to point where it directs a divergent beam parallel to the other or Y axis involved. The flat mirror 65 can be designed to be remounted on the spindle 31 to be perpendicular to the Y axis directed laser beam. Another set of measurements at the same sampling rate are then taken as the spindle is moved again in the same preferably repeatable circular path. By combining the data taken along the X and Y axes, circular tool path indicating signals can be generated and fed to a printer or plotter to draw the ideal and actual circular path movements.

In the explanation of the circle test now to follow, the times when random measurement of spindle position along the X-axis begins will be indicated respectively by T(S) and T(S)'. The random times when the spindle reaches the A, B, C and D positions on the circular path involved for the X and Y axis measurements will be indicated respectively by T(A), T(B), T(C) and T(D) and T(A)', T(B)', T(C)', and T(D)'.

FIGS. 9B and 9C drawn opposite FIG. 9A represent respectively the actual X and Y axis spindle displacement verses time curves oriented at 90 degrees to one another for the various assumed equally spaced sampling times involved, and show the X and Y axis data starting at respectively the different random starting times T(S) and T(S)', Note that at the times T(A), T(B), and T(C) and T(A)', T(B)' and T(C)' representing the time during the sequential measurements when the spindle is programmed to be at the circle positions A, B, C and D that the X axis measurements are respectively at their minimum, median (i.e. half way between their minimum and maximum values), maximum and median X axis displacement positions and the Y axis measurements are respectively at their median, maximum, median and minimum Y axis displacement positions. FIGS. 9B and 9C so indicate as they also indicate that relative to the data collection starting times T(S) and T(S)' the collected data at times T(A)–T(A)', T(B)–T(B)', T(C)–T(C)' and T(D)–T(D)' do not occur at the same times relative to the starting times. In order to be able to output signals to the printer or plotter which will draw circular lines the collected data must be related so that the stored measurement is synchronized or repositioned in storage so that the corresponding A, B, C and D position data is located at the same time slots relative to the start measurement times T(S) and T(S)'. This synchronizing process is illustrated in FIGS. 10A, 10B and 10C.

Accordingly, FIGS. 10A and 10B are the X and Y axis displacement verses sampling time curves of FIGS. 9B and 9C drawn to a horizontally oriented time base when the time axes start at times T(S) and T(S)'. FIG. 10C shows the Y axis displacement curve shifted so that the minimum, median and maximum X axis displacement points of the X axis data curve are opposite the median, maximum and minimum Y axis displacement points, as they would be if such data were taken at the same rather than at different sequential random starting times.

FIG. 11 shows an ideal circular curve representing the desired programmed spindle displacement overlapped by an imperfect circular plot showing the various deviations of the actual measured spindle positions for the corresponding polar positions of the spindle, but with the deviation amounts multiplied by a factor of about 1000 so that the deviations from the actual desired circular path curve can be seen displaced from the desired curve where displacement errors exist. The result of this multiplication operation is added to the corresponding desired displacement data. The thus modified and synchronized actual X and Y axis position data is converted to corresponding X and Y axis data analog signals and fed to a plotter which receives such analog signals to draw the actual position curve shown in FIG. 11.

A printer which receives digital data can be programmed to do the same thing digitally so that the digital printer prints or draws lines representing the desired circular and near circular path position lines like that shown in FIG. 11.

FIG. 12A is a block diagram showing the broad program routine sequences used to do a circular test in the XY-plane as shown in FIG. 11, using a single laser system sequentially to measure the spindle movements along the X and Y axes;

FIG. 12B shows a much more detailed block diagram showing the detailed program sub-routines of the boxes in FIG. 12B. Thus, FIG. 12B shows blocks or boxes numbered 102 followed by different alphabet characters a–h and some with primes (') thereafter represent the various means of the software and/or hardware involved which perform the functions identified in each of the boxes shown. The box labeled 102 in FIG. 8 includes all of these means now to be described. Accordingly, boxes 102a and 102a' identify the means which input the binary data developed by the X and Y axis laser heads to a data file; boxes 102b and 102b' identify the means which converts this binary data to Ascii file (i/e/ digital) data; and common box 102c are the means which synchronizes or re-arranges this data so that the maximum, means and minimum values of the Xdata is opposite or corresponds respectively to the mean, minimum and maximum values of the Y data.

The re-arranged X and Y axis actual object spindle data outputted by the means represented by the common box 102c is fed to the means represented by the boxes 102d and 102d' labeled "Compute and store X data" and "Compute and store Y data" for each position. As previously indicated, these functions preferably include a subtraction and storing operation where the actual X and Y axis error value for each spindle position is indicated in memory. The output of boxes 102d and 102d' are shown fed to a box 102f labeled "Compute and store polar error". This box represents the function of computing the square root of the squares of the X and Y axis data so that the actual angular or polar error for each spindle position is recorded.

The next box 102g shown fed by the output of boxes 102d and 102d' is labeled "multiply X-Y position error and add to desired date". Thus, this box represents the function performed by the means which multiplies by about 1000 or more in most cases the X and Y axis error data for each spindle position and adding the multiplied data to the corresponding desired programmed position value for each position involved. The output of box 102g as shown fed to the next box 102h labeled "Print sequentially desired and modified actual displacement circles" which carries out the function of outputting signals to the printer or plotter involved to display the perfect and imperfect circular lines shown in FIG. 11.

FIG. 13 is a block diagram like FIG. 8 but showing in block form more of the functions carried out by the data collection, storage and processing means shown as a single block 102 in FIG. 8, and wherein a single laser head is used sequentially as described to obtain X and Y axis data to be synchronized, compared, multiplied and then fed to a printer or plotter to draw the overlapping curves of FIG. 11.

FIG. 13 thus has blocks or boxes namely: boxes 102-1 and 102-1' identified respectively as X and Y axis actual position storage means which store the actual X and Y axis object position data; boxes 102-2 and 102-2' identified respectively as X and Y axis desired position storage means which store the desired programmed X and Y axis object position data for the various assumed object positions for which the actual position data was taken; boxes 102-3 and 102-3' coupled to the outputs of the latter boxes and respectively identified as X and Y position comparison and multiplying means which subtracts the desired and actual position data for each of these positions to determine and store the position error and then multiplies the error computations and stores the same; box 102-5 identified as the synchronizing and timing means which controls the timing of the functions performed by the aforesaid boxes; a box 104 identified as a synchronizing and timing means; boxes 102-4 and 102-4' respectively identified as X and Y axis sine and cosine signal generating means coupled to the outputs of the latter boxes; 102-1, 102-1', and 102-3 and 102-3' to generate the sine and cosine signals which when fed to a curve plotting means shown as box 104b will plot circular or circular-like curves as shown in FIG. 11; printing and curve plotting means; and a dashed box 106 which has boxes identified as X and Y axis movement programming means 106a and 106a' coupled to the inputs of boxes 106b and 106b' respectively identified as sine and cosine voltage generating means shown coupled respectively to X and Y axis motors 106c and 106c' which control the movement of a machine tool spindle 31. FIG. 13 also shows a box 104a representing a printer means which receives signals from the X and Y position comparison and multiplying means 102-3 and 102-3' to print circle-like curves from the data stored therein.

For a more general analysis of the operation of the present invention to any two or three dimensional tool path measured by 2 or 3 laser systems, as in the case of the two-dimensional circular path measurement system just reviewed, the data actual target position data is collected at a fixed data rate and synchronized by latching all three data measurements to the same time base (within a small electronic delay time). The tool path R can be expressed as . . .

$$Ri(Xi,Yi,Zi), i=1.2, \ldots N \qquad (2)$$

where Xi, Yi and Zi are data collected with laser #1, #2 and #3 respectively. Assume the programmed tool path is $$rj(xj,yj,zj), j=1,2, \ldots M \qquad (3)$$

First, take two reference points from the programmed tool path and the two corresponding points on the measured tool path. Translate the coordinate system in the measured tool path such that the first reference point r (ref 1) in the programmed tool path coincide with the first reference point R (ref 1) in the measured tool path. That is $$r(\text{ref } 1)=R(\text{ref } 1) \qquad (4)$$

The second reference point is used to check the scales and the angle of the coordinate systems between the measured tool path and the programmed tool path.

For a 2 dimensional tool path, plot both the programmed tool path r and the measured tool path R on the same graph and compare the differences.

For a 3 dimensional tool path, we can project the 3 dimensional tool path to three 2 dimensional tool paths and compare the differences of each 2 dimensional tool paths.

If the differences are very small, the tool path differences D=/r−R/ can be calculated along the normal of the programmed tool path.

For most CNC Machines, the tool paths are very repeatable. It is possible to use only one laser system but measures three times, in X-direction, Y-direction and Z-direction respectively. The three sets of data collected should be the same as the three sets of data collected simultaneously, except the phase relations between these three sets of data have to be determined. The phase relations can be determined by either using an external trigger signal at the same location, or by using a sharp turn on the same location as a marker. Once the phase relations between the three sets of data are determined, the tool path Ri can be generated by the measured Xi, Yi, and Zi.

For example, as shown in FIG. 9A, pointing the laser beam in the X-direction and mounting the flat-mirror target on the spindle, the X-coordinate of the spindle motion can be measured even with large Y-direction movement. By repeating the measurement in the Y-direction, the Y-coordinate of the spindle motion can be measured. Assume the spindle motion is repeatable to certain tolerance, the data on X-coordinate and Y-coordinate can be combined to generate the circular spindle path. As shown in FIGS. 10A, 10B and 10C, the measurement data in the X-direction and in the Y-direction can be combined to generate the circular path. Since the actual tool path is not a perfect circle, the curve as shown are not perfect sine or cosine functions. Hence the combined circular path is not a perfect circle. The deviation from a perfect circle can be calculated and plotted in FIG. 11. The maximum deviation larger than the perfect circle is the Fmax, the maximum deviation smaller than the perfect circle is the Fmin, and the mean deviation from the perfect circle is the circularity.

The following are the actual test conditions for the FIG. 11 plot:

Measuring plan: XY

Direction: X and Y

Feedrate: 20 in/minute

Sampling rate: 30' sec

Rotation sense: CW

Radius: 2 in.

Starting point: X=20 in
    Y=10 in

Distance from target: 30 in

Measuring radius: 2.000092 in

Circularity: ±).000112 in rms.

Radial deviation:
    Fxy, max=+0.000352 in
    Fxy, min=−0.000282 in

The composite tool path can be used to compare the programmed tool path as discussed previously. Of course, the accuracy of this composite tool path is limited by the repeatability of the tool paths and the speed fluctuations of the tool paths. To minimize these effects, it is possible to measure the tool path over several cycles and use the mean value as the measured tool path.

In summary, most CNC Machines are very repeatable, Hence, using only one laser system, the tool path in 2 or 3 dimensions can be measured.

The most important, but not the only, application of the invention is the one described above where the invention determines the accuracy which a machine tool or the like moves an object in a path where there desirably would not be any angular or rotational motion between the beam directing means and the reflector which first receives the beam. However, the invention in its broadest aspects is also applicable in providing a measure of the accuracy of the object moving apparatus involved where the object is desirably to be rotated or pivoted so that the object is to have a desired pitch, yaw and roll motion in addition to an X, Y and Z axis motion. To measure object movement error for all of these motions would require 6 laser measuring systems or operations. In other words, the object measuring operations would require three such systems operated simultaneously as described above to measure the X, Y and Z axis motion accuracy (or one such system operated sequentially as above described) and three more such systems (or one more operated sequentially three more times) to collect the data necessary to compute the pitch, yaw and roll error (resulting from the movement of the object along the same path as before but with the desire pitch, yaw and roll motions imparted to the object at the same path positions the object had during the axial error path determining measurements.) The latter error computations require error computing equations different from those used described above in the X, Y and Z axis error application of the invention.

Accordingly, the claims are intended to cover all of these applications of the invention. The laser measuring system of FIG. 1 using a large retroreflector as shown is the preferred measuring system for the application of the invention for determining the pitch, yaw and roll error data. For this application of the invention, the position error data is collected in the same way as above described for measuring X, Y and Z axis error as the object being moved is moved along the same path but with pitch, yaw and roll components of motion added to the axial components of motion. although the data processing functions are different due to the different equations needed to compute the pitch, yaw and roll error involved.

While, the simple large retroreflector shown in FIG. 1 is the preferred retroreflector, the one shown could be replaced by a corner cube, solid prism, cat-eye or other type of retroreflector.

VI. SOME MAJOR FEATURES OF THE INVENTION

Summaries of some of the features of the invention are as follows:

1. A technique to measure the 3 dimensional, or 2 dimensional tool paths with laser interferometers or LDDMs using the single-aperture laser systems and double-path optical arrangements.

2. A technique to measure the 3 dimensional, or 2 dimensional tool paths with laser interferometers or LDDMs using a lens-systems and flat-mirrors.

3. A technique to measure the 3 dimensional, or 2 dimensional tool paths with only one laser unit but repeated measurements.

4. A technique to synchronize the data of repeated measurement by external trigger signal and to combine the measured data to generate a 3 dimensional or 2 dimensional tool path.

5. A technique to combine the separately measured data to generate a 3 dimensional, or 2 dimensional tool path using specially programmed tool path at locations as marker.

6. Circular test or telescopic ball-bar test with a laser system, a lens system and a long flat-mirror.

7. Mirrors applied as position feedback to control the spindle position or the position of a 3 dimensional stages.

8. The use in the above technique of a divergent beam to reduce an alignment problem.

I claim:

1. A system for determining the degree of accuracy an object is moved along a given path in a space having at least two orthogonal axes by object moving apparatus having a different motor for imparting object movement relative to said respective axes to produce an overall object movement path, said apparatus having programming means having stored in the memory thereof desired object path position data relative to said axes at various reference times, and means responsive to said desired path position data for generating motor-energizing signals for said respective motors to desirably move said object along said desired path; said system comprising:

one or more beam directing means for directing a beam of energy simultaneously parallel respectively to said axes if more than one such means is provided or parallel to one of said axes at a time if only one such means is provided and its beam is to be sequentially directed parallel to said orthogonal axes, at least one beam reflecting means associated with each beam directing means and to be positioned to directly receive the beam from its associated beam directing means, at least one of each of said beam directing means and said at least one reflecting means associated therewith being mountable on said object and the other being mountable on a relatively stationary surface, said at least one reflecting means associated with each beam directing means being sufficiently large to reflect such directed beam to ultimately return the beam to said beam directing means even as the object is moved in a desired path which deviates from the direction in which the beam involved is directed; and signal processing means including means responsive to the return of each reflected beam of energy to the associated beam directing means for developing actual object path position data indicating the actual displacement of said object relative to said axes at sampling times coincident with said reference times; and additional processing means including data collection, storage, comparing and data outputting means for collecting and storing said desired and actual object path position data relative to said axes at said reference and sampling times, and for comparing the stored desired and actual position data at said reference and sampling times and indicating the degree of position error relative to said axes at said sampling times.

2. The system of claim 1 wherein said at least one reflecting means associated with each beam directing means is a flat mirror.

3. The system of claim 2 wherein the associated beam directing means includes lens means for directing a diverging beam to said flat mirror.

4. The system of claim 1 where there is provided a separate beam directing means for each axis so that three beams can be simultaneously directed along each of said axes, simultaneously to collect said actual object position data.

5. The system of claim 1 wherein there is provided only one of said beam directing means to direct a single beam sequentially when re-positioned to do so parallel to said various orthogonal axes as said object moving apparatus repeats the movement of said object along a supposed desired path, to sequentially develop said actual object path position data relative to said respective axes, and said processing means including synchronizing means for relating the actual object position data relative to said respective axes taken in time sequence at said sampling times to the same positions of said object along its path of movement.

6. The system of claim 5 used to collect and process object position data where the object is to be desirably moved in a circular path in a given plane having two orthogonal axes and where said single beam source is to direct its beam sequentially along said axes in said plane; and said synchronizing means including means for relating the object path position data relative to said axes representing the same various object positions along the circular path, and said comparison and outputting means being adapted to compare the corresponding actual and desired path position data at each of said object path positions and to output signals representing the actual and desired object path positions to a printer or plotter to provide a first circle-like display representing the actual object movement along said circular path and a second circular display overlying said first display so that the object position error at the various path positions is visually seen.

7. The system of claim 6 wherein said synchronizing means includes means permitting the sequentially obtained object position data along each of said axes to be taken at random starting times by identifying the maximum, minimum and mean (i.e. half way between the minimum and maximum) actual and desired object position data values and rearranging the stored data so that the maximum, mean and minimum object position values of the data for one axis is related to the mean, minimum and maximum values of the data taken for the other axis.

8. The system of claim 6 wherein said signal processing means includes means for multiplying the object position error data and re-combining the multiplied data with the actual position data so that when outputted to said printer or plotter the first circle-like display representing the actual object path can be readily seen although adjacent to said second circular display representing the desired object path.

9. The system of claim 1 combined with said object, and said at least one reflecting means is mounted on said object and said at least one beam directing means is mounted on a stationary surface.

10. The system of claim 1 wherein there is associated with each of the one or more beam directing means only one reflecting means which is a flat mirror, and the one or more beam directing means is adapted to direct a diverging beam at right angles to the associated flat mirror.

11. The system of claim 10 combined with said object, and said flat mirror associated with each of said one or more beam directing means being mounted on said object.

12. The system of claim 1 combined with said object and wherein there is provided a different beam directing means for each of said axes and oriented to direct its beam parallel to the associated axis, and there being a different one of said at least one reflecting means associated beam reflecting means mounted to intercept the beam directed from the associated beam directing means, and there is provided means for simultaneously operating said beam directing means to simultaneously collect and process the actual object position data.

13. The system of claim 1 wherein each of said one or more beam directing and associated beam reflecting means form an object position measuring system like that shown in FIG. 1.

14. The system of claim 1 wherein each of said one or more beam directing and associated beam reflecting means forms an object position measuring means like that shown in FIG. 2.

15. The system of claim 1 where each of said one or more beam directing and associated beam reflecting means forms an object position measuring means like that shown in FIG. 3A.

16. The system of claim 1 wherein the object is to be moved along said path where at some of the path positions thereof the object is to desirably to be rotated or pivoted producing a desired angular motion; and there is provided added beam directing, reflector and processing means for measuring the actual angular motion of the object at each of said path positions, and comparing the actual with the desired angular motions of the object thereat to provide a measure of the angular movement accuracy of the object moving apparatus.

17. A method for determining the degree of accuracy with which an object is moved along a given path in a space having at least two orthogonal axes by object moving apparatus having a different motor for imparting object movement relative to said respective axes, said apparatus having programming means having stored in the memory thereof desired object path position data relative to said axes for various reference sampling times, and means responsive to said desired path position data for generating motor-energizing signals for said respective motors to desirably move said object along said desired path; said method comprising the steps of:

providing one or more beam directing means for directing beams of energy respectively to be directed parallel to each of said orthogonal axes and one or more beam reflecting means associated with each of said one or more beam directing means for reflecting each of said beams of energy along one or more beam paths which will ultimately return each beam back to its associated beam directing means, at least one of the reflecting means associated with each beam directing means which first receives the directed beam being sufficiently large that it receives said beam even when said object is moved in directions along a circular or other path shape which deviates from the directions said beams are directed, mounting one of each of said beam directing means and said at least one reflecting means associated therewith which first receives the beam from its associated beam directing means on said object and the other on a stationary surface;

providing signal processing means including means responsive to the return of each reflected beam of energy to the associated beam directing means for developing actual object path position data indicating the actual displacement of said object relative to said axes at sampling times coincident with said reference times; and data collection, storage, and comparing means for collecting and storing said desired and actual object path position data relative to said axes at said sampling times, and for comparing the stored desired and actual path position data at said sampling times and indicating the degree of path position error relative to said axes at said sampling times; and directing said one or more beams parallel to said axes and operating said object moving apparatus to move said body along a supposed desired path while said data processing means develops, collects and stores said actual object path position data, compares the stored desired and actual path position data and indicates the degree of position error resulting from said comparison operation.

18. The method of claim 17 where there is provided a separate beam directing means for each of said axes and said separate beam directing means are simultaneously directed respectively along said axes simultaneously to collect said object path position data.

19. The method of claim 17 wherein there is provided only one of said beam directing means which is sequentially directed along said axes as said object is moved along the supposed desired path as said processing means then sequentially carries out said functions thereof.

20. The method of claim 19 wherein said processing means includes synchronizing means of said processing means for relating the actual sequentially obtained object position data relative to said respective axes taken in time sequence to the same positions of said object along its path of movement following which said processing means carries out said comparison function.

21. The method of claim 20 used to collect and process object position data where the object is moved in a circular path in a given plane having two orthognal axes and wherein said processing means calculates from the data stored for each sampled position of said object the deviation of the object movement from a perfect circle.

22. The method of claim 21 wherein said processing means first multiplies the position error data, combines the multiplies error data with said desired object position data relative to said two axes and effects the display of a first given imperfect circular-like curve representing the modified actual circular path of said object in said plane, and combines said desired object position data relative to said axes and effects the display over said first given imperfect circular curve the circular curve produced by said actual object position data relative to said axes.

23. The method of claim 17 wherein said beam directing and associated reflecting means form an object position measuring means like that shown in FIG. 1.

24. The method of claim 17 wherein said beam directing and associated reflecting means form an object position measuring system like that shown in FIG. 2.

25. The method of claim 17 wherein said beam directing and associated reflecting means forms an object position measuring system like that shown in FIG. 3.

26. The method of claim 17 wherein said beam directing and associated reflecting means forms an object position measuring system like that shown in FIG. 3A.

27. The method of claim 21 wherein said comparison means first computes the path position error relative to said axes and then combines the axis position error to provide an indication of polar position error.

28. A method for determining the degree of accuracy with which an object is desirably moved along or with respect to various reference points along a given path in a space having at least two orthogonal axes by object moving apparatus; said method comprising the steps of:

providing one or more beam directing means for directing beams of energy respectively to be directed parallel to each of said orthogonal axes and one or more beam reflecting means associated with each of said one or more beam directing means for reflecting each of said beams of energy along one or more beam paths which will ultimately return each beam back to its associated beam directing means, at least one of the reflecting means associated with each beam directing means which first receives the directed beam being sufficiently large that it receives said beam even when said object is moved in directions along a circular or other path shape which deviates from the directions said beams are directed, mounting one of each of said beam directing means and said at least one reflecting means associated therewith which first receives the beam from its associated beam directing means on said object and the other on a stationary surface;

providing signal processing means including means responsive to the return of each reflected beam of energy to the associated beam directing means for measuring and storing the degree of actual object movement relative to said axes at said path reference points as the object is moved to said path reference points; and data collection, storage, and comparing means for collecting and storing the desired and said measured actual object movement at said path reference points, and for comparing the stored desired and actual object movement data for said reference points and indicating the degree of deviation of said actual from the desired object movement; and directing said one or more beams parallel to said axes and operating said object moving apparatus to impart the desired movement of said body at said path reference points while said beam directing means directs said beams along said axes and said data processing means develops, collects and stores said actual object movement data, compares the stored desired and actual measured object movement at said path reference points and indicates the degree of movement error resulting from said comparison operation.

* * * * *